Patented Dec. 8, 1931

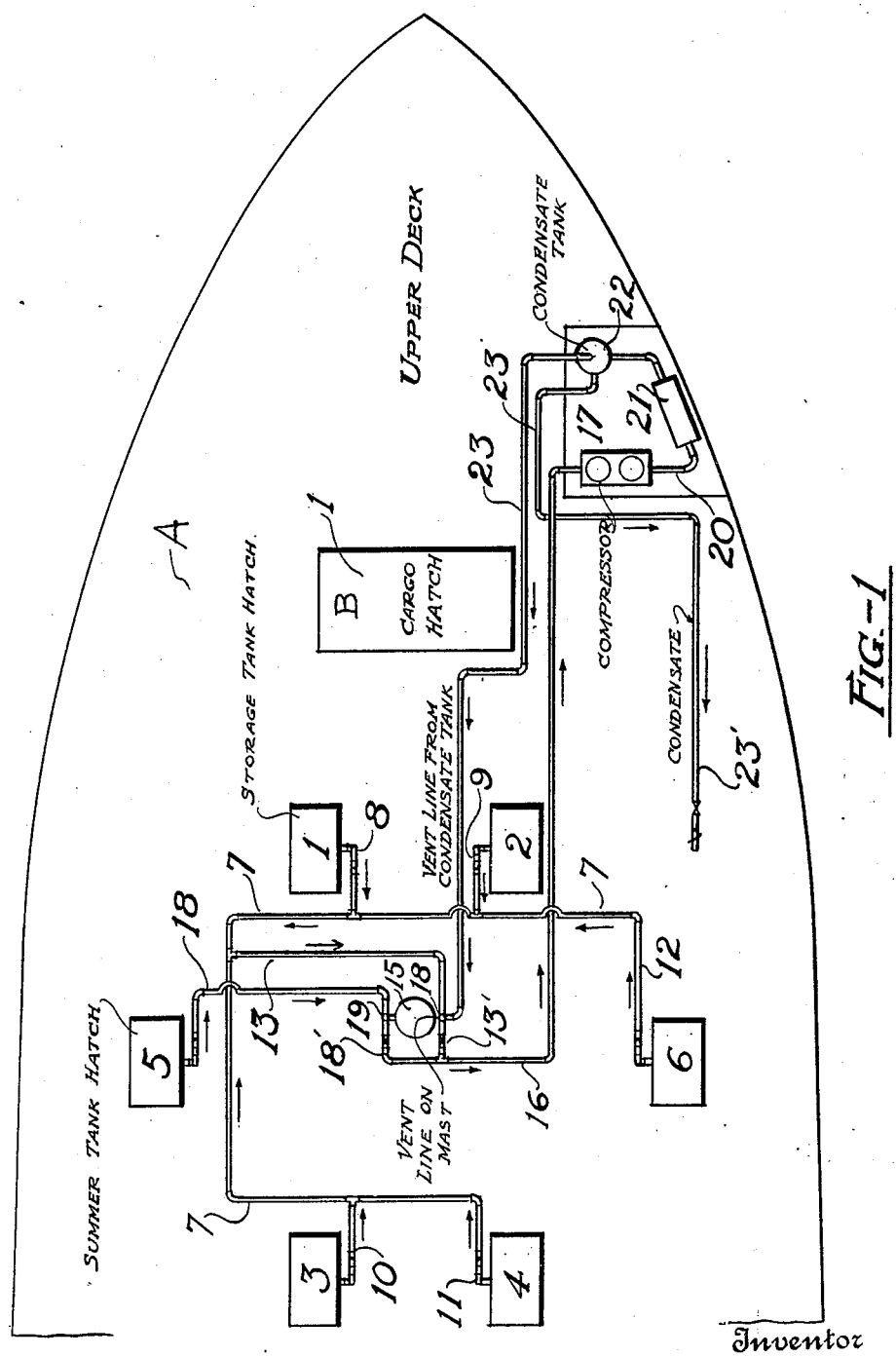

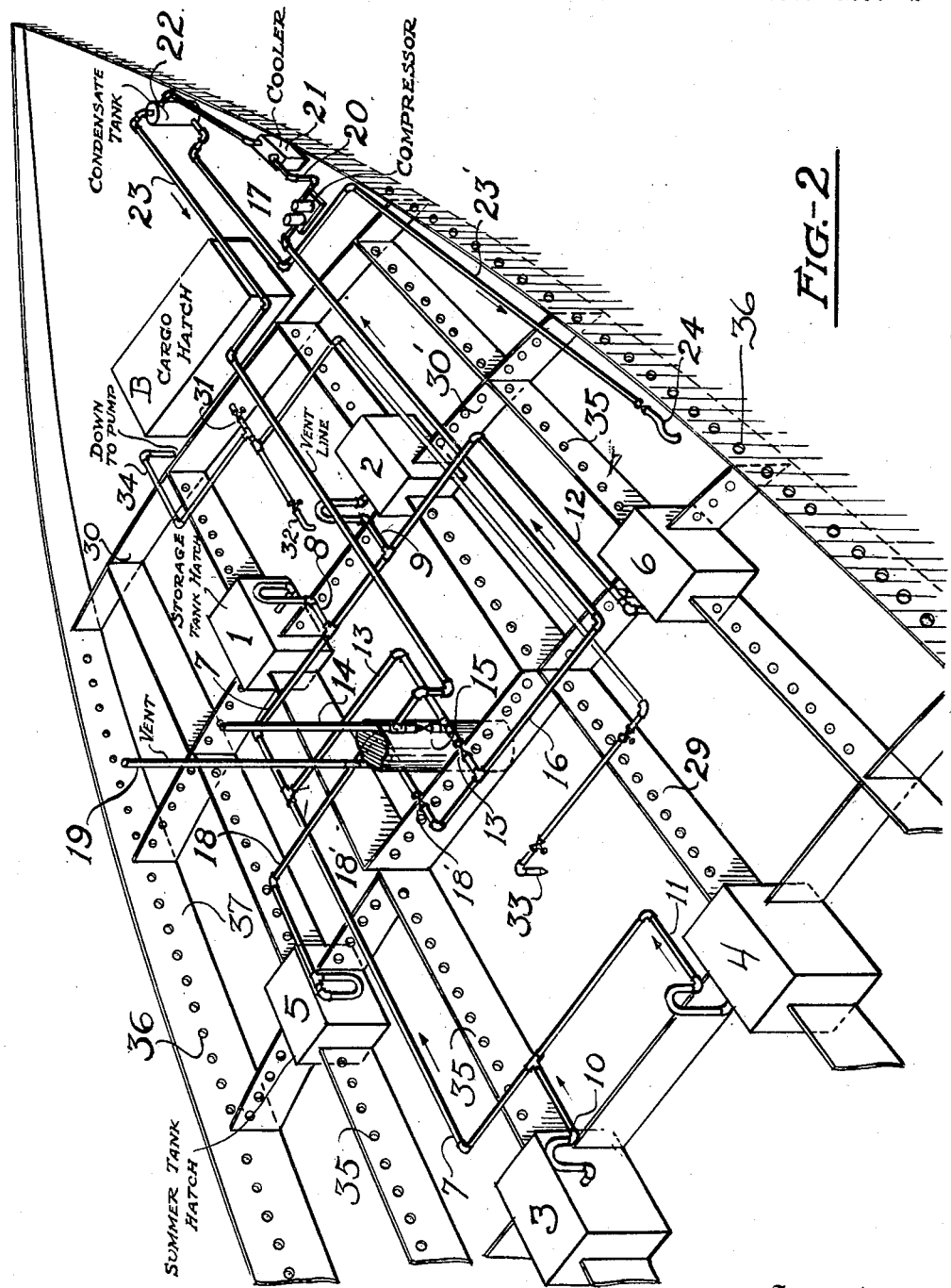

1,835,645

UNITED STATES PATENT OFFICE

ROBERT L. HAGUE, OF NEW YORK, N. Y., ASSIGNOR TO STANDARD OIL DEVELOPMENT COMPANY, A CORPORATION OF DELAWARE

EQUIPMENT FOR LIQUID TRANSPORTING VESSELS

Application filed October 21, 1926, Serial No. 143,278. Renewed September 28, 1931.

This invention relates to the equipment of vessels for the transportation of liquids, especially bulk oil carrying vessels, and includes improvements which make it practical to transport volatile liquids, such as gasolines, naphthas, etc., in the hold, cargo tanks and/or compartments with a minimum evaporation loss. These improvements comprise principally means for disposing of vapors from the liquid cargo and heat insulating means for minimizing the formation of such vapors. The invention will be fully understood from the following description taken in connection with the accompanying drawings, in which Fig. 1 is a diagrammatic plan view of the forward deck of a bulk oil carrying vessel provided with my vapor recovery system;

Fig. 2 is a perspective view of the forward deck of a bulk oil carrying vessel, showing the vapor recovery system, together with means for providing a flowing body of water over the ship's deck and sides;

Referring first to Fig. 1 of the drawings, reference letter A denotes the upper deck of a bulk oil carrying vessel having the main hatch B, the main cargo or storage tank hatches 1, 2, 3 and 4 and the "summer tank" hatches 5 and 6. It will be unnecessary to describe the installation with reference to the amidship and aft cargo tanks, since it is in all essential respects like the forward installation. The port summer tank 5 is to be used as an expansion tank for cargo in the particular case illustrated, to receive any overflow from the other tanks. For simplicity, the pipes for supplying the cargo to the tanks and the overflow pipes are not illustrated.

Figure 3:
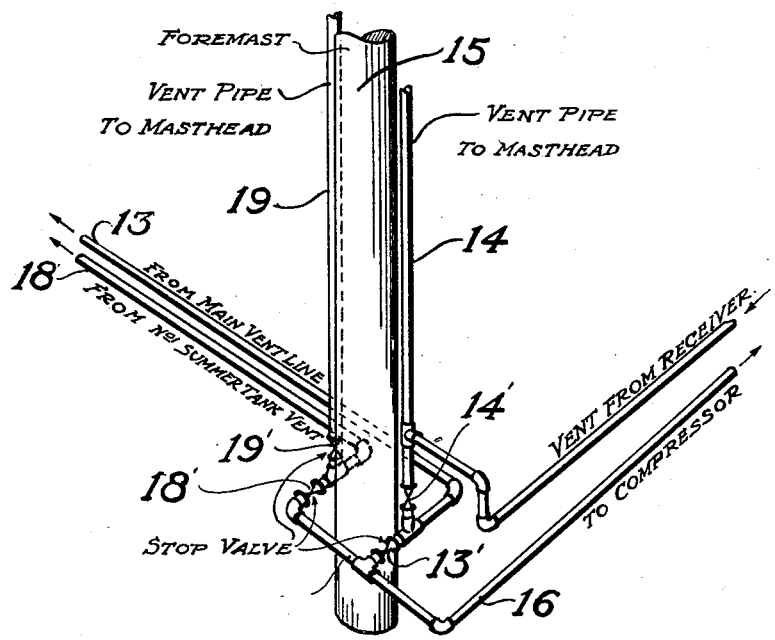
Fig. 3 is an enlarged perspective view of the pipe connections about the foot of the foremast.

Vapors from the main cargo tanks 1, 2, 3 and 4 pass into a pipe 7 through branch pipes 8, 9, 10 and 11, respectively, and from the summer tank 6 through pipe 12. The pipe 7 has a branch pipe 13 which is connected with a vent pipe 14 (Fig. 3) extending up the foremast 15 to a point near the masthead. The pipe 13 is also connected with a pipe 16 which leads to a compressor 17. A valve 14' in the pipe 14 and a valve 13' in the pipe 13 control the flow through these pipes.

The summer tank 5 is connected by a vapor pipe 18 with a vent pipe 19, which extends up the foremast, and also with the pipe 16. Valves 18' and 19' are provided in the pipes 18 and 19, respectively, for directing the flow of vapors.

The compressor 17 discharges through pipe 20 into a cooler 21 from which the condensate and any remaining gas or vapor pass to the condensate tank 22. A vent pipe 23 connects the upper portion of the tank 22 with the vent pipe 14 extending up the foremast. Condensate is returned from tank 22 through a pipe 23' to the forward filling connection 24, or the salvaged condensable constituents may be otherwise disposed of, as desired.

Figure 4:
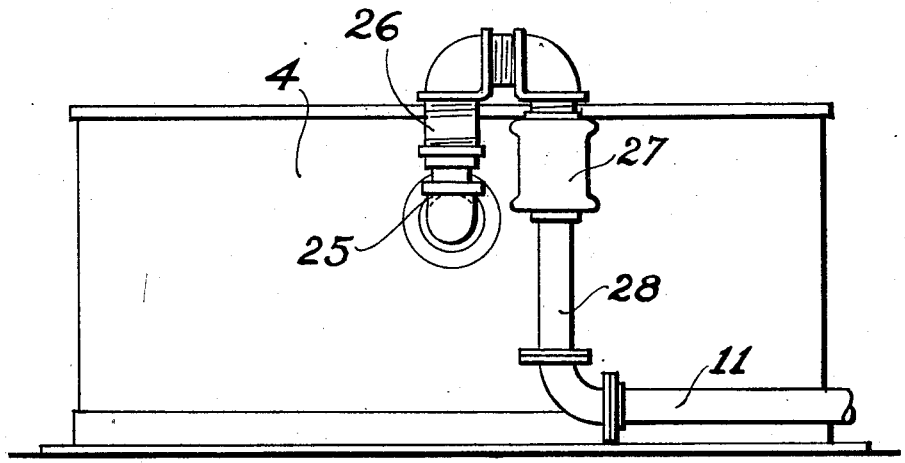
Fig. 4 is a side elevation of the connection of the vapor line to one of the storage tanks.

Fig. 4 illustrates a suitable connection for withdrawing vapors from the storage tanks, reference being made particularly to the tank having the hatch 4, Fig. 1. A pipe 25 is in open communication with the storage tank through the hatch 4 and is connected with an automatic pressure and vacuum relief valve 26. The valve may be set to open at a maximum pressure within the tank of about 4½ lbs. per square inch above atmospheric pressure, and to close at a minimum of about 1½ lbs. per square inch below atmospheric. The setting of the valve may be varied as required by the strength of the tanks and other factors. A flame arrestor 27 is installed in a pipe 28 connected with the pipe 11 which discharges into the vapor pipe 7. As an added precaution, duplicate pressure and vacuum valves may be provided on the summer tank connection. Pressure gauges (not shown) are provided at a convenient point to indicate the pressure on the tanks.

When the vapor pressure in the cargo tanks exceeds the pressure at which the relief valves open, vapors pass through the several branches into the main vapor pipe system 7, 13, and thence through valves 13', (valve 14' being closed), and pipe 16 to the compressor 17. Vapors from the port summer tank 5 similarly pass through pipe 18, valve 18' (valve 19' being closed), and pipe 16 to the compressor. Condensate is returned as described above. If the amount of vapors is not sufficient to justify running the compressor, the valves 13' and 18' are closed and the valves 14' and 19' are opened, permitting the vapors to be vented through the pipes 14 and 19 leading to the masthead.

In order to reduce the amount of vaporization in the vessel's tanks as much as possible, the deck overlying these tanks is divided into compartments by longitudinal and transverse baffle plates denoted respectively by numerals 29 and 30, 30' (Fig. 2). These baffle plates serve as weirs or dams to retain water discharged from nozzles 31, 32 and 33, supplied from a pipe system 34, into which water is pumped from the ocean or other body of water being traversed.

The baffle plates have perforations 35 at such a height as to form step-wise pools of water. In this way a fair uniformity of depth is maintained over the deck, notwithstanding its curvature. It will be understood that the sea water is discharged more or less centrally on the deck, as shown, and flows through the perforations 35 from each compartment to the next lower compartment. Holes 36 are formed in the bulwark 37 and through these holes the water flows from the outer compartments against a side shield and down the vessel's sides.

The heat-insulation system referred to is more particularly described and claimed in my United States patent application Serial No. 143,279, filed of even date herewith.

I prefer to use the water-flooding arrangement described in connection with the vapor recovery system, especially when volatile liquids are being transported. However, the vapor recovery system may be practically used alone. Various changes and alternative arrangements may be made within the scope of the appended claims, in which it is my intention to claim all novelty inherent in the invention as broadly as the prior art permits.

I claim:

1. In combination with a positively cooled liquid cargo tank of a bulk oil carrying vessel, a vapor pipe adapted to convey vapors from said tank, a vent pipe connected to said vapor pipe and adapted to discharge at a point remote from the vessel's deck, means connected to said vapor pipe and adapted to compress and cool the vapors, a pipe for forwarding, to any of the vessel's cargo tanks, condensate formed by the compressing and cooling, and flow-directing valves in the said vapor pipe and vent pipe, whereby the vapors may be diverted either to the vent pipe or to the compressing and cooling means.

2. In combination with the positively cooled liquid cargo tanks of a bulk oil carrying vessel, a vapor pipe receiving vapors from each tank, means connected to said vapor pipe and adapted to remove condensable constituents from said vapors, a receiver for such constituents, a pipe for forwarding the same to at least one of the tanks, and a pipe for discharging incondensable constituents from the receiver at a point remote from the deck of the ship.

3. The combination according to claim 2, in which valve means are provided for diverting all the vapors to the said discharge pipe for incondesnable constituents.

4. In combination with the liquid cargo tanks of a bulk oil carrying vessel, longitudinal and transverse baffle plates arranged to form compartments on the deck surface adjacent said tanks, means for maintaining pools of water in said compartments and for continuously supplying cooling water to said pools, means for discharging the water from the outer compartments down the sides of the vessel, and means for salvaging any condensable vapors discharged from said tanks, said last mentioned means comprising a compressor, a cooler connected thereto, and a tank adapted to receive condensate and vapors from the cooler.

ROBERT L. HAGUE.